United States Patent [19]

Kaaden

[11] Patent Number: 4,793,794
[45] Date of Patent: Dec. 27, 1988

[54] APPARATUS FOR THE MANUFACTURE OF PLASTIC PARTS BY INJECTION MOLDING OR REACTION INJECTION MOLDING

[76] Inventor: Hans-Heinrich Kaaden, Friedrich-Herschel-Strasse 5, 8000 Munich 80, Fed. Rep. of Germany

[21] Appl. No.: 909,841

[22] Filed: Sep. 19, 1986

Related U.S. Application Data

[63] Continuation-in-part of Ser. No. 865,197, Apr. 1, 1986, Pat. No. 4,753,592.

[30] Foreign Application Priority Data

Sep. 26, 1985 [DE] Fed. Rep. of Germany ....... 3534252

[51] Int. Cl.$^4$ .................. B29C 45/30; B29C 45/74
[52] U.S. Cl. ................... 425/549; 264/328.8; 264/328.15; 425/566; 425/569; 425/572; 425/588
[58] Field of Search ............... 425/588, 549, 567–575, 425/577, 589, 548, 564, 566, DIG. 35, DIG. 221; 264/328.8, 328.14, 328.15, 328.16

[56] References Cited

U.S. PATENT DOCUMENTS

| | | | |
|---|---|---|---|
| 2,206,098 | 7/1940 | Lester | 425/568 X |
| 2,233,558 | 3/1941 | Shaw | 425/569 X |
| 2,239,338 | 4/1941 | Norelli | 425/572 |
| 2,579,809 | 12/1951 | Fellows et al. | 425/568 X |
| 2,871,517 | 2/1959 | Allard | 425/572 X |
| 3,935,972 | 2/1976 | Tsunemoto et al. | 425/568 X |
| 4,290,744 | 9/1981 | Dannels et al. | 425/572 X |
| 4,344,750 | 8/1982 | Gellert | 425/572 X |

FOREIGN PATENT DOCUMENTS

| | | | |
|---|---|---|---|
| 20546 | 6/1976 | Japan | 425/572 |
| 86730 | 7/1981 | Japan | 425/572 |
| 14728 | 1/1983 | Japan | 425/588 |
| 166030 | 10/1983 | Japan | 425/588 |
| 181624 | 10/1983 | Japan | 264/328.8 |

*Primary Examiner*—Richard L. Chiesa
*Attorney, Agent, or Firm*—Collard, Roe & Galgano

[57] ABSTRACT

There is provided an apparatus for the manufacture of plastic parts from thermoplastic, thermoset and/or elastomer material by injection molding or reaction injection molding. The apparatus includes a multi-station locking unit of horizontal or vertical configuration adapted to hold a number of molds, and an associated injection unit for the simultaneous injection of the molds. The apparatus further has a movable center mold clamping plate sectioned lengthwise relative to the locking direction, the two parts of the plate being kept together by a high-speed clamping device and having arranged between the parts a melt conduction system having one or a number of separate melt conduction rails. Each melt conduction rail is rigidly clamped at its face between the sectioned mold clamping plate lengthwise relative to the direction of flow of the melt. The apparatus further includes a median centering collar and a widened melt inlet with rounded side walls adapted to receive the nozzle system and which are arranged on a flange of the melt conduction rail. The nozzle system includes a movable cut-off nozzle system part capable of being displaced within itself in the direction of injection and a stationary part which is rigidly mounted on the face side of the melt conduction rail. A melt compensation system is associated with the cut-off nozzle system and located within the melt conduction rail.

16 Claims, 2 Drawing Sheets to # APPARATUS FOR THE MANUFACTURE OF PLASTIC PARTS BY INJECTION MOLDING OR REACTION INJECTION MOLDING

This is a continuation in part of U.S. Ser. No. 865,197, filed Apr. 1, 1986 and now U.S. Pat. No. 4,753,592.

BACKGROUND OF THE INVENTION

The present invention relates to an apparatus for the manufacture of plastic parts from thermoplastic, thermoset and/or elastomer material by injection molding or reaction injection molding. Such apparatus includes a multi-station locking unit of horizontal or vertical configuration designed to hold a number of molds and an associated injection unit for the simultaneous injection of the molds. The apparatus further includes a movable center mold clamping plate sectioned crosswise relative to the locking direction, the two parts being kept together by a high-speed clamping device, and a melt conduction system arranged between the two parts. The melt conduction system has one or a number of melt conduction rails, each of which is rigidly clamped at its face side between the sectioned mold clamping plate lengthwise relative to the direction of flow of the melt, and a median centering collar and a widened melt inlet with rounded side walls designed to receive the nozzle system arranged on a flange of each melt conduction rail.

The injection molding machine described above is disclosed in my earlier filed application U.S. Ser. No. 865,197 and in my application filed contemporaneously herewith, U.S. Ser. No. 909,836 the disclosures of which are herein incorporated by reference.

The arrangement of one or a number of separate melt conduction rails between the parts of the center mold clamping plate which is sectioned lengthwise relative to the locking direction assures rapid and uniform injection of both molds with any shape of the mold. This design of the center mold clamping plate requires consideration of an appropriate design for the cut-off nozzle system.

SUMMARY OF THE INVENTION

It is the object of the present invention to provide in an injection molding machine of the type described above a cut-off nozzle system and arrange the same on the melt conduction duct of the center, sectioned mold clamping plate in such a way that the mold clamping plate can be separated quickly and easily from the associated screw unit, such separation being required for removing the molded parts from the molds.

This object is accomplished in accordance with the present invention by the provision of a cut-off nozzle system capable of being displaced within itself in the direction of injection that is rigidly mounted at the face side of the melt conduction rail, with a melt compensation system being associated with such cut-off nozzle system within the melt conduction rail.

By the cut-off nozzle system according to the invention it is possible to leave the injection unit with one or a number of screw units in a fixed injection position during the manufacturing cycle. The separation of the movable center, sectioned mold clamping plate from the associated screw unit, which is required for the removal of the molded parts from the molds, is accomplished by retracting the cut-off nozzle system which is displaceable within itself. A small amount of force is required to retract the cut-off nozzle system in this manner. Since the cut-off nozzle system only needs to be retracted a minimal distance, the separation an reconnection thereof can take place within a short time span.

Other objects and features of the present invention will become apparent from the following detailed description considered in connection with the accompanying drawings. It is to be understood, however, that the drawings are designed as an illustration only and not as a definition of the limits of the invention.

BRIEF DESCRIPTION OF THE DRAWINGS

In the drawings, wherein similar reference characters denote similar elements throughout the several views.

DESCRIPTION OF THE PREFERRED EMBODIMENT

Figure 1:
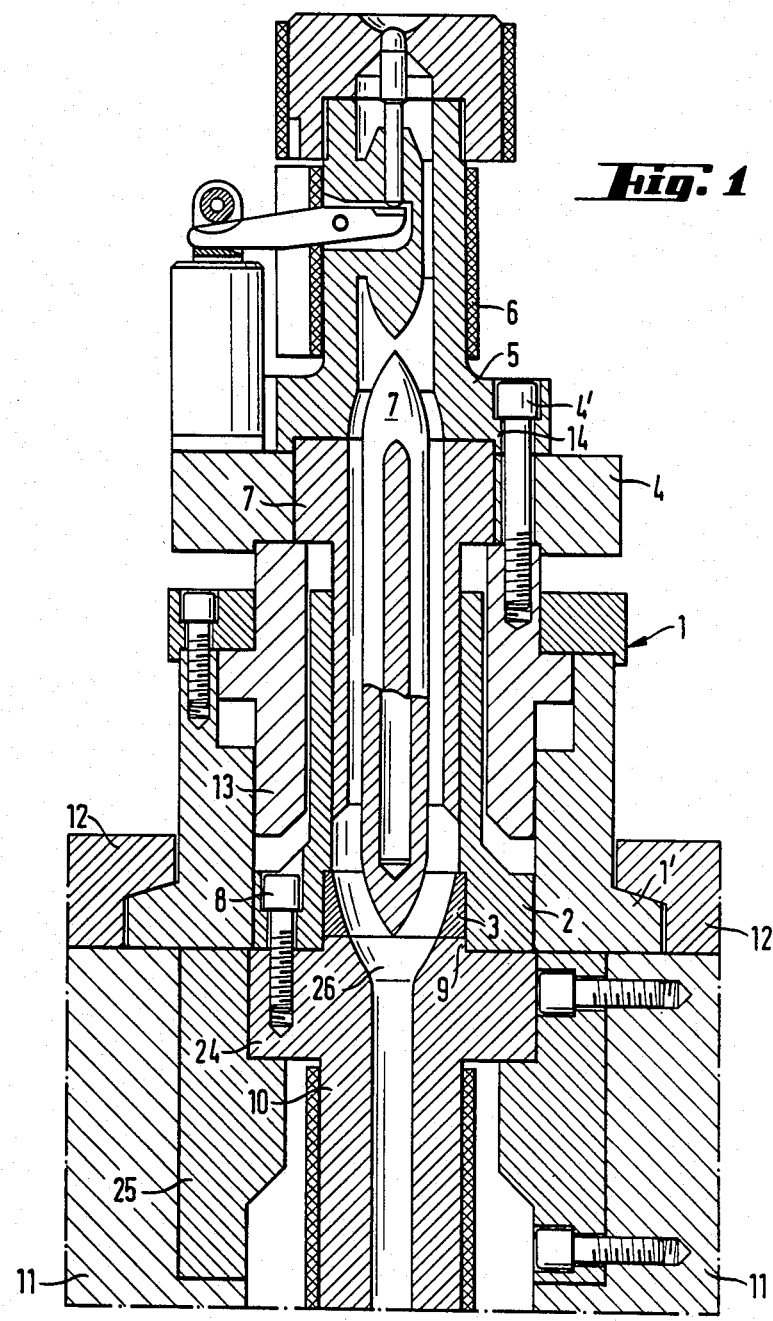
FIG. 1 is a vertical crosssectional view through a portion of a melt conduction rail with the cut-off nozzle system in the injection position, the latter being directly connected to the melt conduction rail and displaceable within itself.

Now turning to the drawings, there is shown in FIG. 1 a melt conduction rail 10 clamped between the two parts of a movable center mold clamping plate that is sectioned crosswise relative to the locking direction. At the face side of melt conduction rail 10 a cut-off nozzle system capable of being displaced within itself in the direction of injection is rigidly mounted, and a melt compensation system is associated with the cut-off nozzle system within melt conduction rail 10.

The cut-off nozzle system is formed by a hydraulic cylinder 1 with a clamping flange 1', an internal torpedo guide sleeve 2 with an internally heated, displaceable torpedo 7, and a displaceable nozzle plate 4 with heatable cut-off nozzle 5. Cut-off nozzle 5 has an external heating system 6. FIG. 1 shows that torpedo guide sleeve 2 is centered by means of centering collar 9 and rigidly connected on top flange 24 of melt conduction rail 10 by means of screws 8. Flange 24 is supported on guide couplings 25, which extend across the width of sectioned mold clamping plate 11, and are connected with the latter. Hydraulic cylinder 1 is fastened on the sectioned mold clamping plate 11 by means of a high-speed clamping device 12, which is arranged on the face side of clamping device 12 and acts on both sides of cylinder 1. A molding ring 3 is arranged between melt inlet 26 and torpedo guide sleeve 2. The displaceable piston of hydraulic cylinder 1 is designed as a ring shaped piston 13.

Nozzle plate 4 is detachably connected on the displaceable piston 13 by means of screws 4'. Displaceable nozzle plate 4 serves to hold cut-off nozzle 5. Nozzle 5 is provided with an external heating system 6 and located on plate 4 by means of a centering collar 14 of torpedo 7, which is fitted in torpedo guide sleeve 2.

Displaceable nozzle plate 4 with externally heated cut-off nozzle 5 placed thereon, and torpedo 7 are rigidly connected with piston 13 of hydraulic cylinder 1. These parts, that is, piston 13, nozzle plate 4, torpedo 7 and cut-off nozzle 5, form as one unit the displaceable or movable part of the cut-off nozzle system, whereas torpedo guide sleeve 2 and a part of hydraulic cylinder 1 form the rigidly arranged or stationary part of the cut-off nozzle system.

Figure 2:
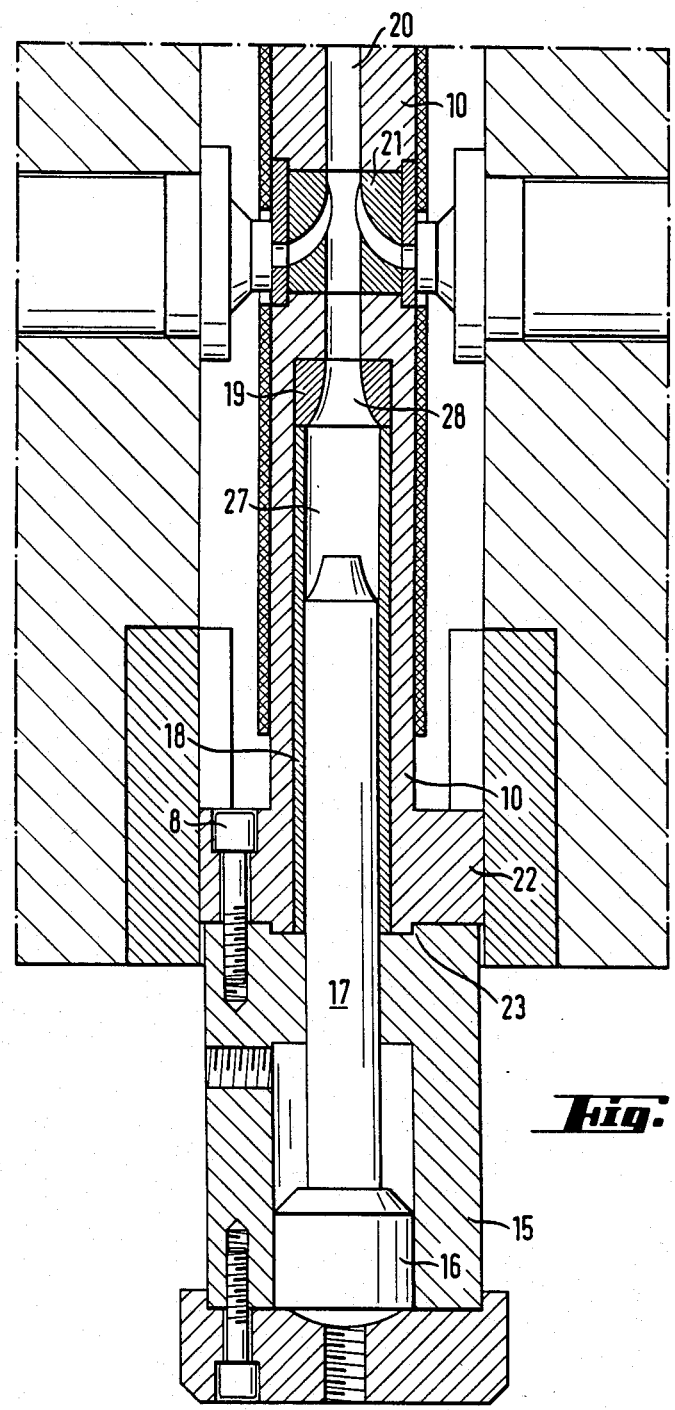
FIG. 2 is a vertical cross-sectional view through part of a melt conduction rail with the chamber of the melt compensation system in the open condition.

As can be seen in FIG. 2, the melt compensation system is arranged at the end of melt conduction rail 10 opposite melt inlet 26. A mounting flange 22 with a centering collar 23 is mounted at this end, whereby the melt conduction rail 10 ends outside the last pair of melt distributors 21 viewed in the direction of flow of the melt. The melt compensation system is formed by a melt chamber 27 with associated hydraulic cylinder 15, a piston 16, piston rod 17 and guide sleeve 18. In this connection, it is important that the holding volume of melt chamber 27 be equal to or greater than the displacement volume of the melt resulting from the displacement of the cut-off nozzle system.

As an extension of central melt conduit 20, a molding ring 19 and guide sleeve 18 are fitted in the melt conduction rail directly after the last pair 21 of melt spreaders viewed in the direction of flow of the melt. Guide sleeve 18 for piston rod 17 of piston 16 ends approximately with the bottom end of melt conduction rail 10. Hydraulic cylinder 15 is detachably connected to mounting flange 22 of melt conduction rail 10 and is centered thereon by means of centering collar 23 located on mounting flange 22.

As clearly seen in FIG. 2, melt conduit 20 of melt conduction rail 10 has a widening 28 at its end disposed opposite melt inlet 26, which widening is enclosed by molding ring 19. The free end of piston rod 17 is shaped to match widening 28. Melt chamber 27 has a larger diameter than melt conduit 20.

On locking of the molding stations of the injection molding machine, the movable part of the cut-off nozzle system moves from the mold clamping plate side 11 toward the stationary part of the cut-off nozzle system associated with the screw unit, closing the separation between center mold clamping plate 11 and the associated screw unit that was required for the removal of the molded articles from the molds. For positive separation, the movable part of the cut-off nozzle system returns to the starting position opening melt chamber 27. This requires that piston 17 of the melt compensation system and the displaceable parts 13, 4, 7, and 5 of the cut-off nozzle system extend synchronously relative to each other.

While only a single embodiment of the present invention has been shown and described, it will be obvious that many changes and modifications may be made thereunto without departing from the spirit and scope of the invention.

What is claimed is:

1. A nozzle system for an apparatus used in the manufacture of plastic parts from thermoplastic, thermoset and/or elastomer material by injection molding or reaction injection molding, said apparatus having a multistation locking unit of horizontal or vertical configuration adapted to hold a number of molds, an injection unit associated with said nozzle system for the simultaneous injection of the molds, a two-part movable center mold clamping plate sectioned crosswise relative to the locking direction, the two parts of said mold clamping plate being kept together by a high-speed clamping device and having a melt conduction system disposed between the two parts, the melt conduction system having one or a number of separate melt conduction rails, each being rigidly clamped at its face side between the sectioned mold clamping plate lengthwise relative to the direction of flow of the melt, and a median centering collar and a widened melt inlet with rounded side walls adapted to receive the nozzle system arranged on a flange of the melt conduction rail, said nozzle system comprising:

a cut-off nozzle system capable of being displaced within itself in the direction of injection, said cut-off system being rigidly mounted on the face side of the melt conduction rail, and a melt compensation system disposed within the melt conduction rail and associated with said cut-off nozzle system, wherein said melt compensation system is arranged in the end of the melt conduction rail opposing the melt inlet, said melt conduction rail ending outside a last pair of melt distributors viewed in the direction of flow of the melt, said melt compensation system further comprising a melt chamber with an associated hydraulic cylinder with a piston, a piston rod and a guide sleeve.

2. The apparatus according to claim 1, wherein the holding volume of the melt chamber is equal to or greater than the displacement volume of the melt resulting from the displacement of the cut-off nozzle system.

3. The apparatus according to claim 2, wherein as an extension of the central melt conduit, a molding ring and guide sleeve are fitted in the melt conduction rail directly following the last pair of melt distributors viewed in the direction of flow of the melt.

4. The apparatus according to claim 3, wherein a mounting flange with a centering collar is arranged at the end of the melt conduction rail.

5. The apparatus according to claim 4, wherein the guide sleeve for the piston rod of the piston of the melt compensation system ends approximately with the bottom end of the melt conduction rail.

6. The apparatus according to claim 5, wherein the hydraulic cylinder is detachably connected and centered on the mounting flange of the melt conduction rail, said flange being provided with a centering collar.

7. The apparatus according to claim 6, wherein the piston of the melt compensation system and the displaceable parts of the cut-off nozzle system are arranged extending synchronously relative to each other.

8. The apparatus according to claim 7, wherein the melt conduit of the melt conduction rail at its end disposed opposite the melt inlet has a widening surrounded by the molding ring.

9. The apparatus according to claim 8, wherein the free end of the piston rod of the piston of the melt compensation system has a shape matching the widening of the melt conduit.

10. The apparatus according to claim 9, wherein the diameter of the melt chamber is larger than the diameter of the melt conduit.

11. The apparatus according to claim 10, wherein the cut-off nozzle system associated with a screw unit and is rigidly connected with the screw unit, and guideways are arranged at the face sides of the adapter forming part of the cut-off nozzle system.

12. The apparatus according to claim 11, wherein the movable center, sectioned mold clamping plate has counterways associated with and matching the guideways of an adapter for producing a form-fitted connection.

13. A nozzle system for an apparatus used in the manufacture of plastic parts from thermoplastic, thermoset and/or elastomer material by injection molding or reaction injection molding, said apparatus having a multi-station locking unit of horizontal or vertical configuration adapted to hold a number of molds, an injection unit associated with said nozzle system for the simultaneous injection of the molds, a two-part movable center mold clamping plate sectioned crosswise relative to the locking direction, the two parts of said mold clamping plate being kept together by a high-speed clamping device and having a melt conduction system disposed between the two parts, the melt conduction system having one or a number of separate melt conduction rails, each being rapidly clamped at its face side between the sectioned mold clamping plate lengthwise relative to the direction of flow of the melt, and a median centering collar and a widened melt inlet with rounded side walls adapted to receive the nozzle system arranged on a flange of the melt conduction rail, said nozzle system comprising:

a cut-off nozzle system capable of being displaced within itself in the direction of injection, said cut-off system being rigidly mounted on the face of the melt conduction rail, and a melt compensation system disposed within the melt conduction rail and associated with said cut-off nozzle system; said cut-off nozzle system comprises a hydraulic cylinder with a clamping flange, an internal torpedo guide sleeve with an internally heated, displaceable torpedo, and a displaceable nozzle plate with a cut-off nozzle provided with an external heating device, said hydraulic cylinder is fastened on the sectioned mold clamping plate by means of a high-speed clamping device arranged on the face side of said clamping plate and acting on both sides of said hydraulic cylinder, a displaceable piston of said hydraulic cylinder is formed as a ring shaped piston, said torpedo guide sleeve is centered by means of a centering collar and rigidly connected on the flange of said melt conduction rail; and a molding ring arranged between the melt inlet and the torpedo guide sleeve.

14. The apparatus according to claim 13, wherein said nozzle plate is detachably connected on the displaceable piston of the hydraulic cylinder.

15. The apparatus according to claim 14, wherein said displaceable nozzle plate is connected with the externally heated cut-off nozzle and the torpedo is rigidly connected with the piston of the hydraulic cylinder.

16. The apparatus according to claim 15, wherein said cut-off nozzle is positioned on said nozzle plate by means of a centering collar of the torpedo fitted in the torpedo guide sleeve.

* * * * *